United States Patent [19]
Hursh

[11] Patent Number: 5,939,113
[45] Date of Patent: Aug. 17, 1999

[54] FREE-STANDING LASAGNA PRODUCT

[76] Inventor: Jeffrey A. Hursh, 1568 Swallow St., Naperville, Ill. 60565

[21] Appl. No.: 08/804,215

[22] Filed: Feb. 21, 1997

Related U.S. Application Data

[63] Continuation-in-part of application No. 08/485,713, Jun. 7, 1995, abandoned.
[51] Int. Cl.$^6$ .................................................. A21D 13/00
[52] U.S. Cl. ........................... 426/94; 426/275; 426/283; 426/451; 426/496; 426/557
[58] Field of Search .............................. 426/94, 557, 451, 426/275, 282, 283, 496

[56] References Cited

PUBLICATIONS

Peggy Knickerbocker, Grown–up Lasagna Recipes of Youth Adapted with Style and Common Sense, Jan. 1992.
Rombauer et al. "Joy of Cooking". pp. 215–216, 1975

*Primary Examiner*—Lien Tran
*Attorney, Agent, or Firm*—Donald E. Egan

[57] ABSTRACT

Disclosed is a fast cooking pasta product, which has no pastry components, but which has a bottom layer of pasta which is crisp and chewy and one or more intermediate layers of pasta which have a soft and moist and/or al dente texture. The product is made with the various layers having a moisture content controlled within established limits. The pasta product of the present invention, which is preferably round in shape, may be cooked quickly by subjecting it to temperatures in excess of 550° F. to achieve the desired textures without burning the product.

19 Claims, 3 Drawing Sheets

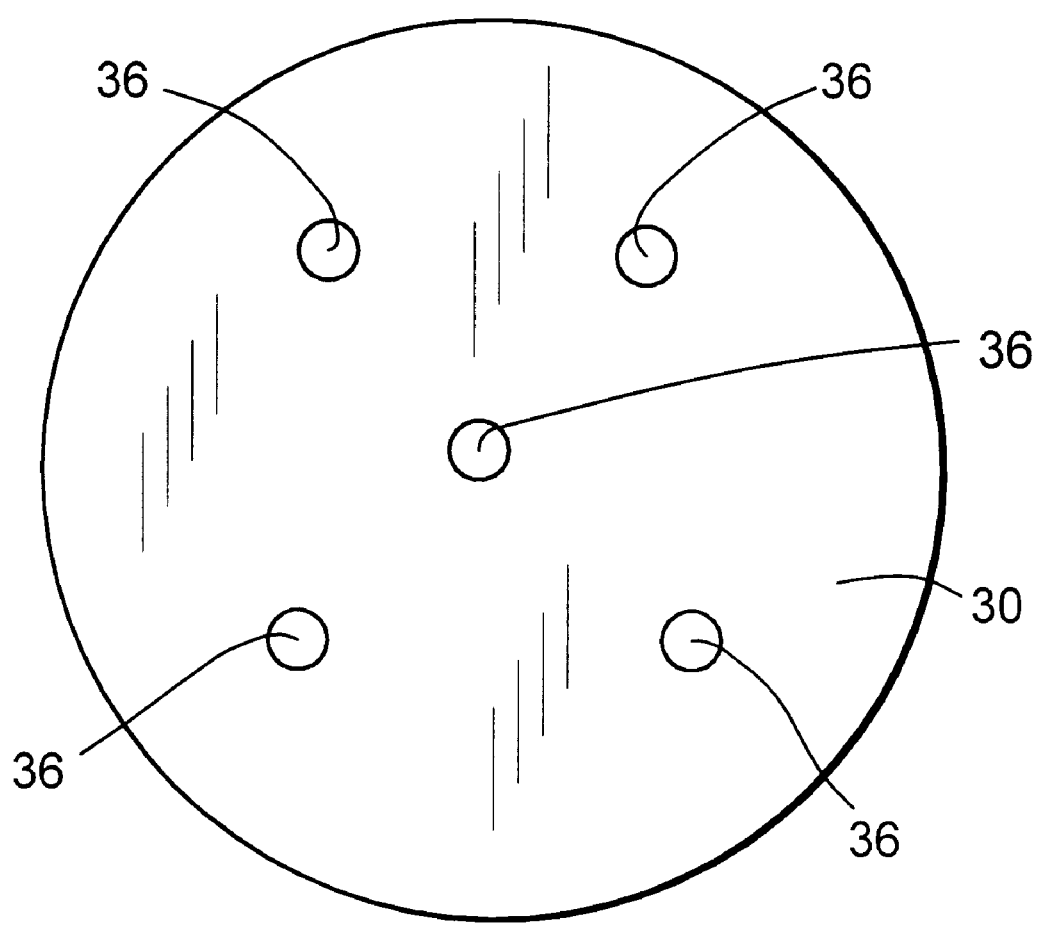

FREE-STANDING LASAGNA PRODUCT

This application is a continuation-in-part of application Ser. No. 08/485,713 filed Jun. 7, 1995, now abandoned.

The present invention relates to a fast-cooking pasta lasagna-type product which has no pastry components, but which has a crisp and chewy pasta bottom layer, and a soft and moist and/or al dente texture pasta intermediate layers. The present invention also relates to a lasagna product, that is adapted to be rapidly cooked, so that it may be served in restaurants or other commercial establishments as a "fresh-cooked" product within a short period of time. In the preferred embodiment, the present invention relates to a lasagna-type product which may be pre-baked to form a free-standing lasagna product, which may be removed from the cooking vessel and finally baked without using a cooking vessel.

The pasta product of the present invention, which is preferably round in shape, may be cooked quickly by subjecting it to cooking conditions which would burn a conventional lasagna-type product, that is temperatures in excess of 550° F. in conventional ovens or at temperatures in excess of 500° F. in high intensity convection ovens. The pasta product of the present invention can be rapidly cooked under such extreme conditions to achieve the desired textures, without burning.

Conventional pasta products, such as lasagna, are relatively slow cooking. They are usually prepared from pre-cooked pasta, and assembled with hot or cold ingredients and thereafter require from 45 minutes to an hour and a half at temperatures of 350–400° F. to cook. The pasta of the present invention on the other hand, may be taken from the refrigerator and cooked at higher temperatures, without burning and thus prepared in 30 minutes or less.

Conventional lasagna products which must be cooked in some type of cooking vessel, typically an aluminum pan or a baking dish. Such conventional products are difficult to cook to a consistent, uniform texture. Frequently, the corners of the product are burned, while the center is uncooked or even cold. This results in a product in which the filling is runny with a soupy texture. Moreover, the amount of cooking required to completely heat the center of the product frequently results in conventional pastas which are overcooked. Typically, lasagna is made of strips of pre-cooked pasta. Products made from pre-cooked pasta frequently have a texture which is too soft, which is characteristic of overcooked pasta.

The pasta product of the present invention when rapidly cooked, even under high temperature or intense cooking conditions, develops a bottom crust having a crisp and chewy texture with an interior portion which is thoroughly cooked, as a result of the components which have a carefully controlled moisture level when the product is assembled.

One objective of the present invention is to create a fast-cooking pasta product. The fast cooking characteristic of the product of the present invention is an important criteria for commercial food serving operations, such as in restaurants. It has been has discovered that by controlling the moisture in the various components of the product, a fast cooking product can be achieved. It has also been discovered that by extending the bottom pasta layer to form an upwardly extending side rim to create a monolithic container for the product, the product can be par-baked in a cooking vessel under conditions which cause the pasta to set or become rigid and thus create a free standing product which may be removed from the cooking vessel. The free standing product may be finally baked, without a cooking vessel, in a short period of time.

A second objective of applicant's invention is to create a product having a crust or bottom layer which is crisp and chewy, i.e. it has a texture which is similar to pizza, but which is made from pasta. It is submitted that applicant's product, which has a crisp and chewy pizza-like texture, made of pasta, is truly unique. Most persons, who sample the product of the present invention for the first time, get the impression that the bottom layer is a pizza-type pastry, although the bottom layer is actually a pasta. This unique texture is obtained only by creating the product of the present invention.

The pasta product of the present invention is a lasagna-like product which is preferably prepared from three layers of fresh pasta having controlled moisture levels, separated by cheese emulsion layers having controlled moisture levels and topped with a tomato-based sauce which may include "toppings" such as vegetables, sausage, mushrooms, or the like, which also have a controlled moisture level. The moisture content of the pasta layers, the cheese emulsion layers and the top layer are controlled within the limits in order to give a product which has the desired crisp and chewy bottom layer with al dente and/or soft and moist intermediate layers.

The pasta product of the present invention has a number of advantageous features. Because the moisture content of each component is controlled when the product is assembled, the cooked product of the present invention has three pasta layers, each of which has a different texture. The bottom layer, which serves as the crust, has a crisp and chewy texture, while the middle pasta layer has an al dente texture, and the top layer has a soft and moist texture. In the preferred embodiment, the product is made using fresh, rather than pre-cooked pasta. The fresh pasta absorbs the moistures and flavors from the cheese emulsion layers which provides for improved flavor, in addition to achieving the aforesaid texture.

The product of the present invention is preferably prepared in a circular shape which promotes rapid, even cooking. The product may be cut into pie shaped portions and served. Such traditional pie shaped portions resemble a pizza-type product. The product of the present invention may be finished with traditional-type flavorings, not unlike a Chicago-style deep dish, or stuffed pizza.

The present invention contemplates the use of varying type and varying amounts of flavoring in order to create a product having the desired taste. Taste is defined as a perception based on four flavors, namely: bitter, sour, sweet and salty or some combination thereof, which must be perceived in the mouth or through the nose. However, it is the texture of the product of the present invention which is unique, rather than the taste or flavor. Texture is by definition a characteristic which may be perceived by touch or by sight and therefor texture is unlike taste. Most persons, who sample the product of the present invention for the first time, got the impression that the texture of the bottom layer is a pizza-type pastry, although the bottom layer is actually a pasta. This perception of the crisp and chewy "pizza-like" texture was uniformly shared by the thousands of people who saw, touched and ate the product of the present invention at "Taste of Chicago". This unique texture is obtained only by creating a product having the structure described and using components having the moisture contents as defined herein.

As used herein, the term "fast-cooking" means a product which can be cooked and served in a relatively short period of time, using intense cooking conditions. For example, the products of the present invention, may be cooked at temperatures in excess of 500° F., and preferably at temperatures of at least 550° F., in a conventional oven, or at temperatures of in excess of 450° F., and preferably at temperatures of at least 500° F. in a high intensity convection oven of the type used in commercial establishments to cook pizza. Examples of suitable commercial high intensity convection ovens include the Middleby PS-5705 or the Blodgett "Master-Therm" conveyor oven, Model MT3870. The latter oven has an input of 150,000 BTU/hr and generates oven temperatures as high as 600° F. Those skilled in the art will understand that the size of a product will influence the cooking time and that generally a smaller product will cook quicker than a comparable larger product. Accordingly, the cooking conditions (time and temperature) must be adjusted depending upon the size of the product. The cooking conditions used to cook the products of the present invention are sufficiently intense to burn a conventional pasta product of comparable size.

The product of the present invention has the ability to retain its desirable texture and desirable flavor after cooking for a greater period of time than conventional lasagna products. This attribute allows the product of the present invention to be par-baked in a cooking vessel and, after cooling, removed from the cooking vessel. The par-baked product may be kept under refrigerated conditions and the finally baked at a commercial establishment in a matter of minutes and delivered to a customer for consumption as a fresh cooked product. The product also may be prepared using this two step cooking process with an enhanced crisp and chewy bottom layer and without a loss of flavor.

DESCRIPTION OF THE DRAWINGS

In order that the invention may be more readily understood, including the preferred embodiments of the invention, reference is made to the drawings, in which:

FIG. 8 is a top view of the upper pasta layer showing the vent openings.

DETAILED DESCRIPTION OF THE PRESENT INVENTION

The product of the present invention generally comprises three pasta layers, separated by cheese emulsion layers and finished with a topping which includes pizza-like garnishes, tomato sauce and cheese. The preferred embodiment of the present invention contemplates a bottom pasta layer which includes an upwardly extending side rim which rises to the top of the product to form a monolithic container for the product. The monolithic container enables the product to be par-baked in a cooking vessel, cooled, removed from the cooking vessel and then finally baked without an external cooking vessel. The product of the present invention can be cooked rapidly to provide a crisp and chewy bottom layer and side wall.

Figure 1:
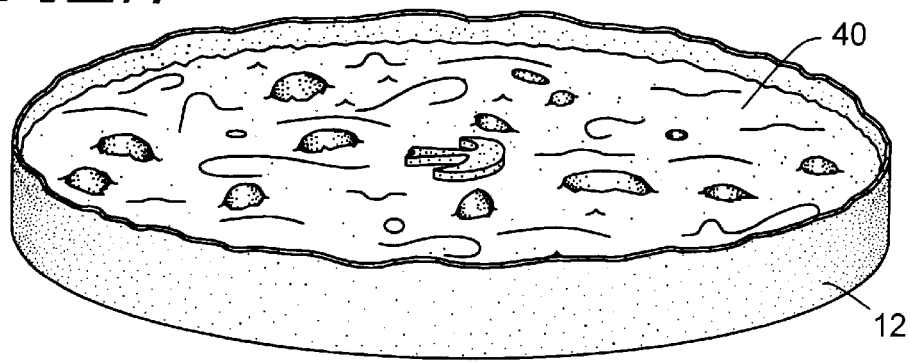
FIG. 1 is a perspective view of the free-standing lasagna product of the present invention.
Figure 2:
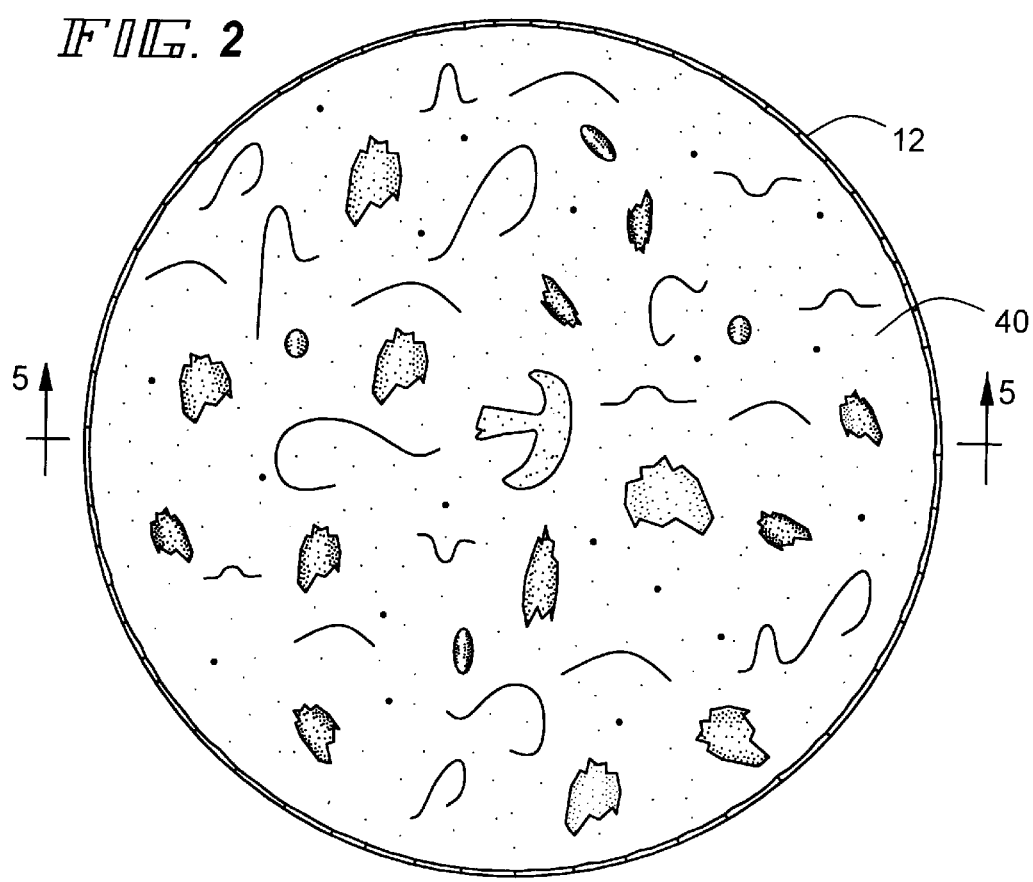
FIG. 2 is a top plan view thereof.
Figure 3:
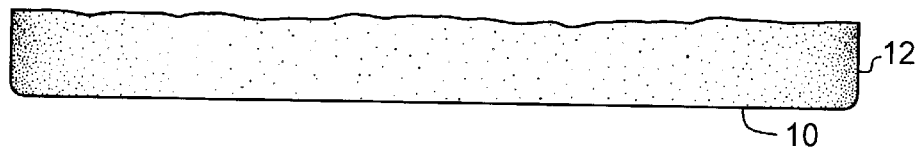
FIG. 3 is a side elevational view thereof, the undisclosed side being substantially the same.
Figure 4:
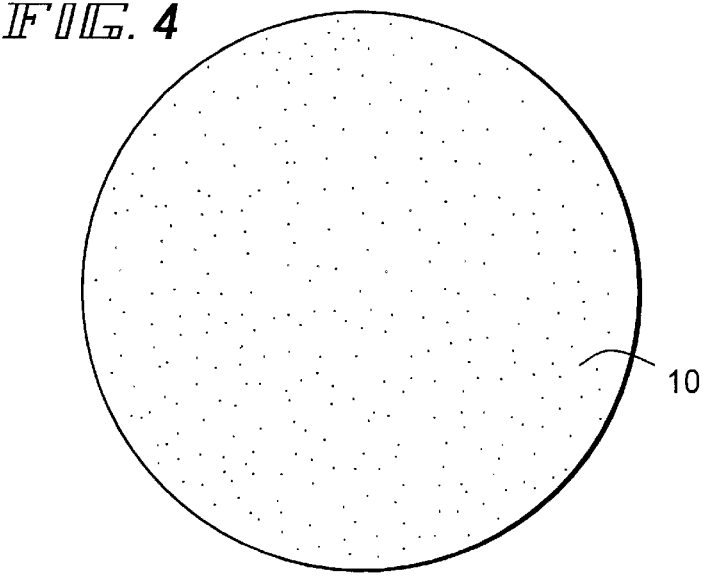
FIG. 4 is a bottom plan view thereof.
Figure 5:
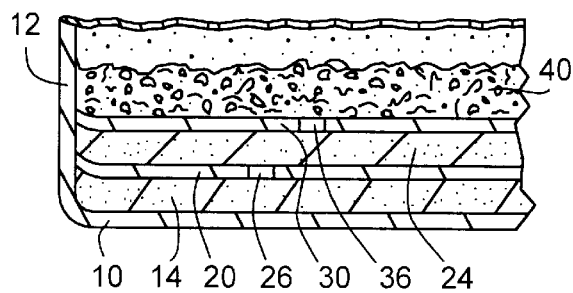
FIG. 5 is a partial sectional view thereof, taken along line 5—5 of FIG. 2.
Figure 7:
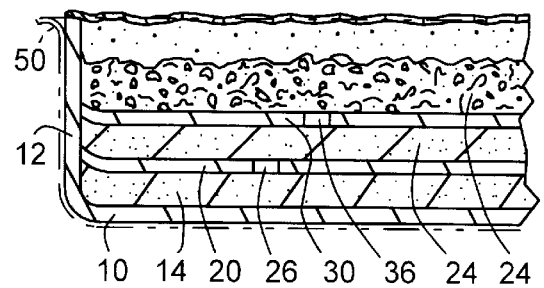
FIG. 7 is a sectional view of the free-standing lasagna product of the present invention, as shown in FIG. 6, wherein the cooking vessel is shown in dashed lines, taken along line 7—7 of FIG. 6.
Figure 6:
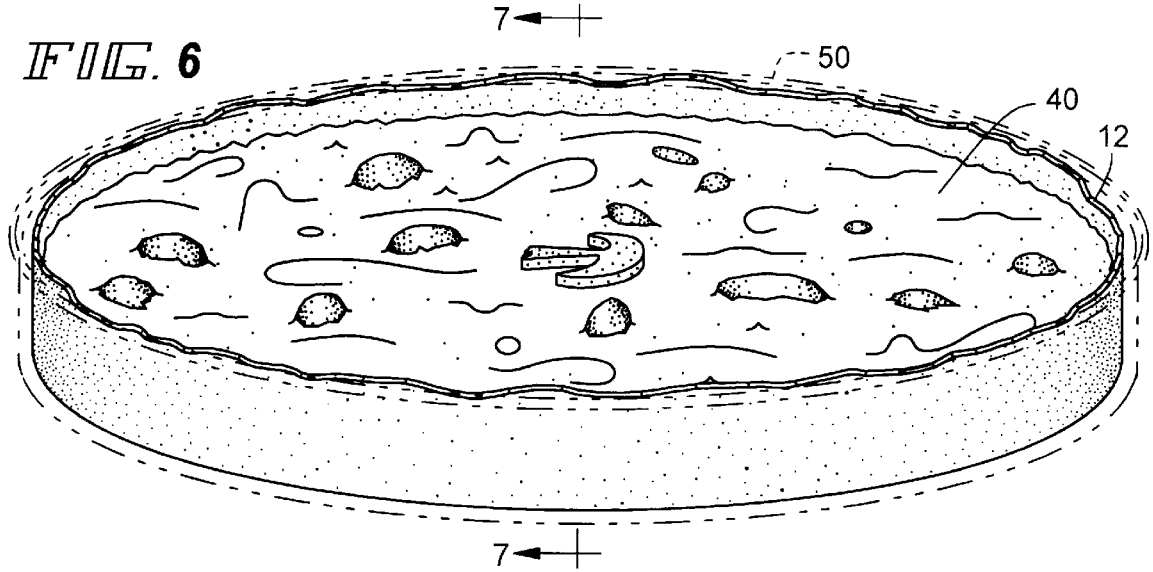
FIG. 6 is a perspective view of the free-standing lasagna product of the present invention, positioned within a pan or cooking vessel, wherein the cooking vessel is shown in dashed lines.

Having reference to the drawings, and particularly to FIGS. 5 and 7, the preferred embodiment includes bottom pasta layer 10 and upwardly extending rim 12, intermediate pasta layer 20 and upper pasta layer 30. Cheese emulsion layer 14 is disposed between bottom pasta layer 10 and intermediate pasta layer 20. Cheese emulsion layer 24 is disposed between intermediate pasta layer 20 and upper pasta layer 30. Top layer 40 is disposed on upper pasta layer 30. Preferably the product is assembled in a cooking vessel, as illustrated by pan 50 show in dashed lines in FIGS. 6 and 7. Intermediate pasta layer 20 and upper pasta layer 30 extend to and contact upwardly extending side rim 12, and they tend to form a seal therewith during the cooking operation. Accordingly, it is preferred to provide intermediate pasta layer 20 and upper pasta layer 30 with vent openings 26 and 36 which allow any steam or water vapors which may be created during the cooking operations to escape. FIG. 8, depicts upper pasta layer 30, which is provided with five vent openings 36. Intermediate pasta layer 20 is provided with similar vents 26. The vent openings 26 and 36, in intermediate pasta layer 20 and upper pasta layer 30, respectively are also shown in FIGS. 5 and 7.

The product of the present invention achieves its desired texture and consistency by rigorously controlling the moisture content of the various layers which make up the product. It is deemed essential to control the moisture levels of the various layers in order to achieve the preferred product. The rapid cooking of the product, as explained herein, enhances the crisp and chewy texture of the outer layer of the product.

THE PASTA

The pasta used to prepare the product of the present invention is preferably a freshly prepared pasta. It is preferred that flour used for the pastas having a high content of seminola wheat. A recipe for a suitable pasta is as follows:

| | |
|---|---|
| unbleached bread flour | 360 grams |
| seminola flour | 330 grams |
| large eggs | 6 |
| olive oil | 60 ml |
| water | 30 ml |

These ingredients are mixed in a food processor using kneading hooks until a consistent texture is developed. The pasta is then extruded or rolled into ⅟16 inch thick sheets. Preferably, the sheets are wide enough to cut a circle 11½ inches in diameter that can be use as the upper pasta layer or the intermediate pasta layer in a 12 inch product. In preparing the product of the preferred embodiment, it is preferred to cut a pasta circle of approximately 15 to 16 inches in diameter from a single piece of pasta. This size enables the bottom pasta layer to extend across the entire bottom of the pan, thus forming the horizontal portion, and up the sides of the pan to form upwardly extending side rim. Because the fresh pasta which is preferably used to prepare the product of the present invention is pliable and somewhat elastic, it can be shaped and stretched to cover the bottom and cover the side of the circular pan to create a monolithic container for the product. If desired, any pasta from the bottom layer which extends above the rim of the pan may be trimmed off using a roller.

The pasta used for each pasta layer of the present invention is preferably freshly prepared pasta having a moisture content of between about 26 and about 35 percent. A most preferred pasta was measured as having a moisture content of about 29.3 percent by weight. Pasta having a moisture content less than about 24 percent by weight was too dry, which made it difficult to handle and resulted in a product having an uncooked texture. Although pre-cooked pasta can be employed, it is generally less preferred because the moisture content is too high and the texture of the resulting product will be less firm. Consequently, the product prepared from pre-cooked pasta will run and disintegrate when it is cut.

If desired, flavored or colored pastas may be used. For example, spinach, tomato, or basil pasta may be used.

Preferably, the pasta layers are circular, having a diameter somewhat smaller than the diameter of the vessel in which the product is prepared and cooked, inasmuch as the pasta expands during cooking. For example, a circular sheet of pasta having an uncooked diameter of 11½ inches will expand to fill a 12 inch pan on cooking. The pasta preferably has a thickness of about 1/16 inch before cooking, which will expand to about ⅛ inch on cooking. As was mentioned above, for the preferred embodiment it is preferred to use a single 15 to 16 inch diameter pasta circle for the bottom pasta layer, in order to produce the horizontal portion with the upwardly extending side rim to create a monolithic container for the product from a single piece of pasta.

CHEESE EMULSION

The cheese emulsion comprises a major component of the lower portion of the product. The cheese emulsion, in addition to providing flavor and texture, provides the moisture necessary to cook the adjacent pasta layers to the desired textures.

A suitable cheese emulsion may be made from the following materials:

| | |
|---|---|
| ricotta cheese (30% moisture) | 1361 grams |
| whole eggs (large) | 6 |
| romano cheese | 80 grams |
| parmesan cheese | 40 grams |
| granulated garlic | 4 grams |
| black pepper | 4 grams |
| dry parsley | 2 grams |

The foregoing ingredients are whipped in a food processor to achieve a thoroughly homogenous blend. Preferably the cheese emulsion is allowed to condition in the refrigerator for several hours prior to use.

The cheese emulsion of the present invention should have a moisture content in the range of 60–67 percent by weight. A most preferred cheese emulsion was measured to have a moisture content of about 65.8 percent. Emulsions having a moisture content less than 60 percent were too dry and produced an undesirable texture. Similarly, emulsions having in excess of 69 percent moisture were too moist and produced a product with undesirable textures.

TOP LAYER SAUCE

The top layer is made up of a top layer sauce and a selection of toppings. The top layer must have a moisture content of about 90 percent in order to provide the moisture necessary to cook the pasta layers within the product, but the moisture must be sufficient to retain the moisture texture of the top layer as well. A suitable top layer sauce for use in the product of the present invention is as follows:

| | |
|---|---|
| crushed tomatoes | 5.68 kg |
| whole tomatoes (sliced) | 2.89 kg |
| water | 500 ml |
| oregano | 10 grams |
| basil | 10 grams |
| crushed red pepper | 4 grams |
| salt | 36 grams |
| garlic cloves (crushed) | 60 grams |

The components for the sauce are combined and then immediately allowed to condition overnight at refrigerator temperatures (40–45° F.) prior to use.

PRODUCT ASSEMBLY

An example of the preparation of the preferred product of the present invention is as follows:

The round 12 inch diameter by 2 inch high aluminum pan is first oiled using vegetable shortening to coat both the walls and bottom of the pan. Alternatively, the walls and bottom of the pan may be oiled with butter flavored Crisco or olive oil.

It is essential to provide a layer of the oil or shortening between the bottom of the pan and the bottom pasta layer in order to produce a bottom layer of pasta having the desired crisp and chewy texture.

A circular sheet of pasta about 15 to 16 inches in diameter and 1/16 inch thick, weighing about 200 grams, is then cut or formed for use as the bottom pasta layer. The pasta circle is placed in the pan to cover the entire bottom of the pan and to extend upwardly, along of the sides of the pan, to form a side rim which encircles the periphery of the entire product and creates a monolithic container for the product.

The bottom pasta layer is then covered with a ¼ inch layer of a cheese emulsion, of the type described above. The cheese emulsion is spread on the pasta with a spatula or a pastry gun (fitted with a suitable thin extruder). The cheese emulsion is spread across the entire pasta layer and completely covers the pasta. This requires about approximately 150 to 225 grams of the emulsion. Preferably, about 175 grams of the emulsion is used for a 12 inch product. The pasta covered with the cheese emulsion layer is then placed in the pan.

A layer of from 75 to 125 grams of shredded mozzarella cheese is sprinkled over the cheese emulsion. It is preferred to use about 100 grams of the mozzarella. The mozzarella cheese, in addition to providing flavor and texture, provides good adhesion between the cheese emulsion and the pasta layer.

A second circular intermediate sheet of pasta, about 11½ inches in diameter (about 113 grams) and having several vent openings, is placed, as a single sheet, over the mozzarella cheese. The edges of the intermediate pasta sheet preferably contact the upwardly extending rim of the bottom layer of pasta.

The second pasta layer is covered with a ¼ inch layer of cheese emulsion, which requires about 175 grams. Again, the cheese emulsion is spread from wall to wall.

A second layer of shredded mozzarella cheese 100 grams is sprinkled over the cheese emulsion. The mozzarella cheese, in addition to providing flavor and texture, provides good adhesion between the cheese emulsion and the pasta layer.

A third circular upper layer of pasta, about 11½ inches in diameter, (about 113 grams) and having several vent openings, is placed, as a single sheet, over the mozzarella cheese. Again, the edges of the intermediate pasta sheet preferably contact the upwardly extending rim of the bottom layer of pasta.

This completes the assembly of an intermediate product which, if desired, may be stored for later finishing and cooking. The intermediate product may be maintained in excellent condition for up to two days, provided it is refrigerated and is covered in a manner which will prevent moisture from evaporating from the pasta. Alternatively, the intermediate product may be frozen and maintained in a frozen condition for 3 to 6 months at temperatures below 0° F., provided it is sealed to avoid the loss of moisture.

THE TOP LAYER

To complete the product, a top layer is then applied to cover the third pasta layer. The top layer is made up of selected toppings, mozzarella cheese and the tomato-based top layer sauce, described above. The topping may be selected from a variety of components such as mushrooms, sausage, olives, vegetables, pepperoni, and the like. Any toppings which are conventionally used with pizza may be used singly or in combination as the topping on the product of the present invention. The selected toppings are first placed on the third pasta layer.

A layer of about 200–250 grams of shredded mozzarella cheese, preferably about 225 grams, is spread over the toppings. The top layer sauce, described above, is then spread over the layer of shredded mozzarella cheese. About 400–550 grams of the tomato-based top layer sauce is applied. When completed, the top layer is about ½ inch to ¾ inch thick. The top layer must have an overall moisture content of about 90 percent. When high moisture toppings such as vegetables are used, a reduced amount of tomato-based layer of sauce is used, in order to hold the overall moisture content of the top layer to about 90 percent.

About 5 grams of shredded dry romano cheese is then sprinkled over the tomato sauce, primarily as a garnish. Finally, about 15 ml of olive oil is drizzled over the cheese and tomato sauce in order to prevent the tomato from burning when the product is cooked.

The present invention is not limited to the specific product described above. For example, a thin crust product is contemplated wherein two layers of pasta are separated by one layer of cheese emulsion layer, which is then topped with the topping ingredients described above. Such a product will cook in a reduced amount of time while retaining the desired chewy textured crust and al dentJ intermediate pasta layer.

Alternatively, a deep dish product may be prepared comprising four layers of pasta, separated by three cheese emulsion layers and topped with the topping described above. Such a product requires additional cooking times, but the desirable textures described above are retained.

A further embodiment contemplated by the present invention is to reverse the order of the cheese and tomato sauce in the topping. It is contemplated that this reversed order could be applied to a three pasta layer product or a "thin" two pasta layer product described above. In either case, reversing the cheese and tomato sauce position results in a classic brown cheese appearance, rather than the tomato sauce on the top, which gives a product a deep dish appearance.

As was mentioned above, colored and flavored pastas such as spinach, tomato, or basil pasta may be used in lieu of conventional pastas. It is also contemplated to add hot sauce or other toppings to the product after cooking, but before serving.

In the preferred embodiment, the pasta of the present invention is assembled as a round or circular shape which enables it to cook faster, particularly from a frozen state, than a similar square or rectangular product.

COOKING

The product of the present invention is preferably cooked using a 2 step cooking process, where in the product is par-baked for a time sufficient cause the outer pasta layer, i.e. the bottom and the side rim, to set or stiffen and become sufficiently rigid to provide a free standing product. The conditions use for par-baking will vary depending upon the size of the product. For example, the 12 inch product, described above can be suitably par-baked in a conventional oven at 500° F. for 10 minutes or in a high intensity convection oven at 450° F. for 6 minutes, while 3 minutes at 450° F. in a high intensity convection oven were adequate for a 7 ounce product. After the product has been par-baked, it may be cooled and then removed from the cooking vessel. The par-baked product may be stored and finished by cooking at elevated temperatures for a relatively short period of time.

The pasta product of the present invention may be rapidly cooked in the pan at elevated temperatures to produce a product with the desired textures without burning. A freshly made 12 inch product which is about an 1.5 inches thick (as described above) can be fully cooked in 30 minutes at 500–550° F. in a conventional oven with no burning and no burnt corners which is usually the case in square or rectangular pasta products. A similar freshly prepared product can be cooked in 20 minutes at temperatures of 625–675° F. in a conventional oven. Frozen products require a greater cooking time. Generally, the product will cook quicker at the higher temperatures. The product of the present invention may be cooked at conventional pasta cooking temperatures, i.e. 350° to 400° F. using longer cooking times, if desired, but it has been found that superior crisp and chewy texture develops at the higher temperatures which burn conventional products.

Alternatively, the product of the present invention may be rapidly cooked in commercial high intensity convection oven at somewhat lower temperatures, but in a shorter time. As is shown by the examples which follow, the products of the present invention cook thoroughly under conditions which burn prior art pasta products.

It has been found that the product of the present invention may be baked at temperatures at high as 675° F., although many conventional ovens have an upper temperature limitation of 550° F. The time required to thoroughly cook the product of the present invention depends upon the temperature of the oven, the size of the product, and the temperature of the product at the time it is placed in the oven.

By way of example, a 12 inch product, of the type described above, starting at room temperature, may be cooked in 25 minutes in a 550° F. conventional oven, or for 30 minutes in a 500° F. conventional oven, or 20 minutes at a 650° F. oven. A similar 12 inch product, when frozen, may be cooked to completeness at 650° F. within about 40 minutes in a conventional oven.

EXAMPLES

The following examples will serve to illustrate the preparation and cooking of some fast cooking pasta products within the scope of the present invention. It is understood that these examples are set forth merely for illustrative purposes and many other compositions are within the scope of the present invention. Those skilled in the art will recognize that products containing other ingredients or condiments and other quantities of the required materials may be prepared.

Example 1

A fast cooking pasta product was made according to the forgoing specification which weighed 7 ounces and which was about 5 inches in diameter and 1½ inches thick. The product was made with three layers of fresh pasta, including the bottom layer, each of which had a moisture content between about 26 and 35% by weight. The product was made with two cheese emulsion layers, each of which had a moisture content of about 60 to 67% by weight. The product included a top layer comprising tomato sauce and cheese which had a moisture content of about 90% by weight. This product was then par-baked at in a convection conveyor oven at 450° F. for 3 minutes. Over 5000 of these products were made, par-baked, removed from the pan and then final baked at 480° F. for 7½ minutes, which produced a thoroughly cooked product with the characteristic crisp and chewy textured bottom crust and with no burning. It is necessary to control the moisture of the components to achieve this crisp and chewy texture.

During the "Taste of Chicago" food fair more than 5000 of these products were cooked, cut in half and each half was sold as an individual portion for consumption. Over 9000 of these individual portions were sold. Most of these portions which were sold were tasted by more than one person. Thus during the "Taste of Chicago" the product was tasted by more than 18,000 people.

During the "Taste of Chicago", over 1000 of the people who tasted the product were interviewed. Without exception, every one of the tasters interviewed thought the crisp and chewy-textured bottom crust of the product was a pizza (pastry) crust and expressed surprise when they were told that the bottom crust was made with pasta.

Example 2

In order to compare the product of the prior art to the product of the present invention, a "Lasagna" product (the "prior art" product) was prepared in accordance with the description on Page 215 of the "Joy of Cooking", by Rombauer & Becker, BOBBS-MERRILL COMPANY, New York 1975. Specifically, a double portion of the "Italian Meat Sauce for Pasta I" described on Page 352 of the "Joy of Cooking" was prepared. The "Lasagna" was prepared by spreading a thin layer of the Meat Sauce in two 13×9×2 baking dishes, followed by a layer of pasta (2 inch noodles) which had been pre-cooked in salted water with 2 tablespoons of olive oil to the al dente stage. The pasta layer was covered by sprinkling Ricotta cheese, crumbled Mozzarella cheese and grated Parmesan Cheese. Another layer of meat sauce was spooned over all of the cheeses and another layer of pasta was placed crisscross followed by another layer of cheeses. A third layer of sauce, cheeses and pasta was put in place. The third layer of pasta was covered with sauce and it was dusted with Parmesan cheese. The product in each of the pans weighed about 3.75 pounds.

For the comparative test, a 12 inch product of the present invention, as described in the above, was made with three layers of fresh pasta, including the bottom layer, each of which had a moisture content between about 26 and 35% by weight. The product was made with two cheese emulsion layers, each of which had a moisture content of about 60 to 67% by weight. The product included a top layer comprising tomato sauce and cheese which had a moisture content of about 90% by weight. The product of the present invention was round, 12 inches in diameter, about 2 inches deep and weighed about 5.5 pounds.

A first comparative cooking test was run by cooking the prior art product and the product of the present invention in a conventional oven at 600° Fahrenheit for 25 minutes. The prior art, "Joy of Cooking" product, was burned on the top and was burned on the bottom so badly as to render the product unfit for eating, although the interior of the product was fully cooked and not burned. Applicant's product was thoroughly cooked, with no burned spots and with the characteristic crisp and chewy, pizza-like bottom crust.

Example 3

A second comparative cooking test was run by cooking both the prior art product and the product of the present invention in a Middleby PS-5705 conveyor convection oven at 540° F. for 13 minutes. The prior art, "Joy of Cooking" product, was again burned on the outside, although it was less burned than in the comparative cooking test of Example 2, but the interior of the "Joy of Cooking" product, while heated, was not cooked, e.g. the interior cheeses were not melted. Applicant's product again was thoroughly cooked, with no burned spots and with the characteristic crisp and chewy, pizza-like bottom crust.

Both of these comparative cooking tests demonstrate that the product of the present invention can be cooked at elevated temperatures, i.e. it is fast cooking, without burning as contrasted to the prior art product which burned under the same conditions. When cooked under intense conditions designed to cook the product very rapidly, the use of pasta for the bottom layer in combination with the controlled moisture levels of the other components, enables the product of the present invention to form a crisp and chewy bottom layer without burning, i.e. to be cooked faster than the prior art product. The failure of the prior art product to thoroughly cook, as in Example 3, is unexpected, particularly given that the product of the present invention was larger than the prior art product (5.5 pounds vs 3.75 pounds).

If desired, the pasta product of the present invention may be fitted with a pop-up timer which will indicate when the center of the pasta product has reached the preferred temperature of 165–175° F. The product of the present invention may be cooked to internal temperatures of 180–190° F., at which time the pasta product begins to brown slightly.

The product is most readily prepared by placing the components in the vessel in which it will be par-baked or cooked. The vessel, as described above, may be an aluminum dish with vertical side walls of sufficient depth to contain the product. Alternatively, the product may be par-baked or cooked in stainless steel, disposable aluminum, glass, or other containers, as will be understood by those skilled in the art.

After the product has been assembled and par-baked, it may be baked in a short period of time, either in or out of the pan.

The scope of the invention herein shown described is to be considered only as illustrative. It will be apparent to those skilled in the art that numerous modifications may be made therein without departing from the spirit of the invention or the scope of the appended claims.

I claim:

1. A free-standing lasagna product having a crisp and chewy bottom pasta layer and at least one soft and moist and/or al dente texture intermediate pasta layer, said product adapted to be fast cooked, without a cooking vessel, without burning, said product comprising:

at least two pasta layers, including a bottom layer and an upper layer, said pasta layers having a moisture content of from about 26 to about 35 percent;

said bottom layer having a horizontal portion extending across the entire bottom of said product and having an upwardly extending side rim which encircles the periphery of said product, said side rim extending upwardly to at least to the upper pasta layer of said product to form a monolithic container for said product;

a cheese emulsion layer separating said pasta layers, said cheese emulsion having a moisture content of from about 60 to about 67 percent;

a top layer disposed upon said upper pasta layer, said top layer comprising tomato sauce and cheese, and having a moisture content of about 90 percent;

said product having been par baked, said horizontal portion and said side rim being sufficiently rigid to support said product.

2. The free-standing lasagna product as described in claim 1, wherein said side rim extends upwardly to said top layer.

3. The free-standing lasagna product as described in claim 1, wherein said free-standing lasagna product is circular in shape.

4. The free-standing lasagna product as described in claim 1, wherein each of said pasta layers consists of fresh pasta.

5. The free-standing lasagna product as described in claim 1, wherein all of said pasta layers, other than said bottom layer, have at least one vent opening.

6. The free-standing lasagna product as described in claim 1, which comprises 3 pasta layers and 2 cheese emulsion layers.

7. A fast cooking lasagna product having a crisp and chewy pasta bottom layer and soft and moist and/or al dente texture pasta intermediate layers, said product adapted to be par-baked under conditions which cause said bottom pasta layer to become sufficiently rigid to support said product and adapted to be fast cooked, without burning, said product comprising, from the bottom:

at least two pasta layers, including a bottom layer and an upper layer, said pasta layers having a moisture content of from about 26 to about 35 percent;

said bottom layer having a horizontal portion extending across the entire bottom of said product and having an upwardly extending side rim which encircles the periphery of said product, said side rim extending upwardly to at least to the upper pasta layer of said product to form a monolithic container for said product;

a cheese emulsion layer separating said pasta layers, said cheese emulsion having a moisture content of from about 60 to about 67 percent;

a top layer disposed upon said upper pasta layer, said top layer comprising tomato sauce and cheese, and having a moisture content of about 90 percent.

8. The fast cooking lasagna product as described in claim 7, wherein said side rim extends upwardly to said top layer.

9. The fast cooking lasagna product as described in claim 7, wherein said lasagna product is circular in shape.

10. The fast cooking lasagna product as described in claim 7, wherein all of said pasta layers, other than said bottom layer, have at least one vent opening.

11. The fast cooking lasagna product as described in claim 7, wherein each of said pasta layers consists of fresh pasta.

12. The fast cooking lasagna product as described in claim 7, which comprises 3 pasta layers and 2 cheese emulsion layers.

13. A fast cooking lasagna product having a crisp and chewy bottom pasta layer and at least one soft and moist and/or al dente texture intermediate pasta layer, said product adapted to be cooked at temperatures in excess of 550° F., without burning, said product comprising:

at least two pasta layers, including a bottom layer and an upper layer, said pasta layers having a moisture content of from about 26 to about 35 percent;

a cheese emulsion layer separating said pasta layers, said cheese emulsion layer having a moisture content of from about 60 to about 67 percent; and a top layer comprising tomato sauce and cheese, said top layer having a moisture content of about 90 percent.

14. The fast cooking lasagna product as described in claim 13, wherein said lasagna product is circular in shape.

15. The fast cooking lasagna product as described in claim 13, wherein each of said pasta layers consists of fresh pasta.

16. The fast cooking lasagna product as described in claim 13, wherein all of said pasta layers, other than said bottom layer, have at least one vent opening.

17. The fast cooking lasagna product as described in claim 13, which comprises 3 pasta layers and 2 cheese emulsion layers.

18. The fast cooking lasagna product as described in claim 13, wherein said bottom layer comprises a horizontal portion extending across the entire bottom of said product and an upwardly extending side rim which encircles the periphery of said product, said side rim extending upwardly to at least to the upper pasta layer of said product to form a monolithic container for said product.

19. The fast cooking lasagna product as described in claim 13, wherein said side rim extends upwardly to said top layer.

* * * * *